F. L. WHITE & H. P. JARVIS.
CHURNING APPARATUS.
APPLICATION FILED JULY 6, 1908.
908,924.
Patented Jan. 5, 1909.
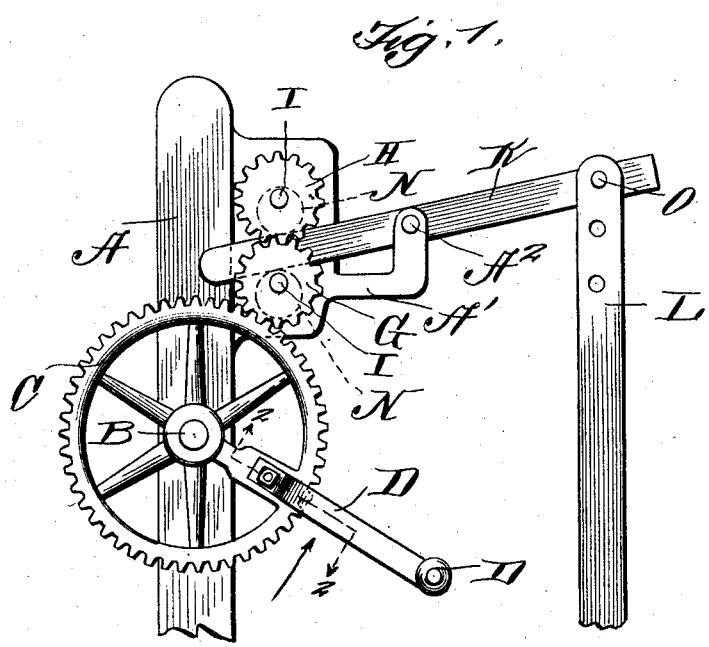
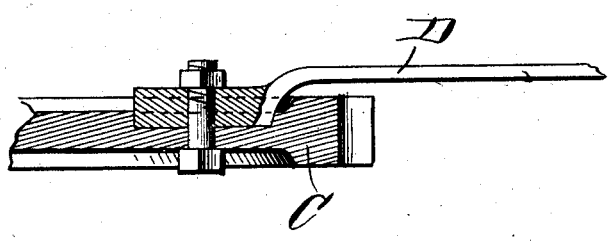
Witnesses
Inventors
Hall P. Jarvis.
And Frank L. White.
By Franklin N. Hough
Attorney

UNITED STATES PATENT OFFICE.

FRANK L. WHITE AND HALL P. JARVIS, OF LITTLE ROCK, ARKANSAS.

CHURNING APPARATUS.

No. 908,924.  Specification of Letters Patent.  Patented Jan. 5, 1909.

Application filed July 6, 1908. Serial No. 442,135.

*To all whom it may concern:*

Be it known that we, FRANK L. WHITE and HALL P. JARVIS, citizens of the United States, residing at Little Rock, in the county of Pulaski and State of Arkansas, have invented certain new and useful Improvements in Churning Apparatus; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in churning apparatus and comprises essentially two cams between which is mounted one end of a pivotal lever connected to a dasher, the cams being actuated by intermeshing gear wheels to which power is applied from a master gear wheel.

The invention comprises various details of construction, combinations and arrangements of parts which will be hereinafter fully described and then specifically defined in the appended claim.

We illustrate our invention in the accompanying drawings, in which:—

Figure 1 is a side elevation of the apparatus, and Fig. 2 is a sectional view on line 2—2 of Fig. 1.

Reference now being had to the details of the drawings by letter, A designates a standard carrying a stub shaft B upon which a master gear wheel C is journaled, and D designates a shaft which is fastened to a recessed spring of said wheel and has a handle D' fixed thereto. Also mounted upon said standard are the two intermeshing gear wheels G and H, each being mounted upon a pivot pin I. N—N designate eccentric wheels which are fixed to the shafts I. Projecting from said standard is an arm A' carrying a pivot pin $A^2$ upon which the lever K is pivotally mounted. The short end of said lever extends between said eccentric wheels and its other end is pivotally connected to a pin O upon the dasher shaft L.

The operation of our invention will be readily understood and is as follows:—As the master wheel is rotated, the intermeshing gear wheels are caused to rotate in opposite directions and, as the cam wheels rotate therewith and between which the short end of the lever bears, said lever will be caused to tilt upon its pivot and impart a reciprocating motion to the dasher.

What we claim to be new is:—

A churning apparatus comprising a standard having a laterally projecting winged portion with an integral angled upwardly extending arm thereon, intermeshing pinions pivotally mounted upon said winged portion, an eccentric rotating with each pinion, a lever pivotally mounted upon the upwardly extending end of said arm and having one arm extending intermediate said eccentrics and positioned between the adjacent faces of the pinions and the winged portion, and a dasher pivotally connected to the other arm of the lever, as set forth.

In testimony whereof we hereunto affix our signatures in the presence of two witnesses.

FRANK L. WHITE.
HALL P. JARVIS.

Witnesses:
W. C. ADAMSON,
JNO. D. SHOCKLEFORD.